United States Patent

[11] 3,625,496

[72] Inventor June Richard Bornor
Rockford, Ill.
[21] Appl. No. 873,191
[22] Filed Nov. 3, 1969
[45] Patented Dec. 7, 1971
[73] Assignee Alco Standard Corporation
Valley Forge, Pa.

[54] SEALING ASSEMBLY FOR HEAT-TREATING APPARATUS
4 Claims, 5 Drawing Figs.
[52] U.S. Cl.................................................. 263/40 R,
34/242
[51] Int. Cl..................................................... F27b 3/02,
F26b 25/00
[50] Field of Search.......................................... 263/36, 39,
40 R, 41; 34/242

[56] References Cited
UNITED STATES PATENTS
802,517  10/1905  Kugel........................... 263/41 X
2,517,470  8/1950  Erisman....................... 34/242 X
3,020,647  2/1962  Butts............................ 34/242

Primary Examiner—John J. Camby
Attorney—Wolfe, Hubbard, Leydig, Voit & Osann

ABSTRACT: A gastight seal is established between a vessel and a closure unit of a heat-treating apparatus by an elongated flexible gasket which simply may be wrapped around the outer peripheries of the vessel and the closure unit and anchored in place by a releasable clamping band adapted to contract around the gasket.

PATENTED DEC 7 1971 3,625,496
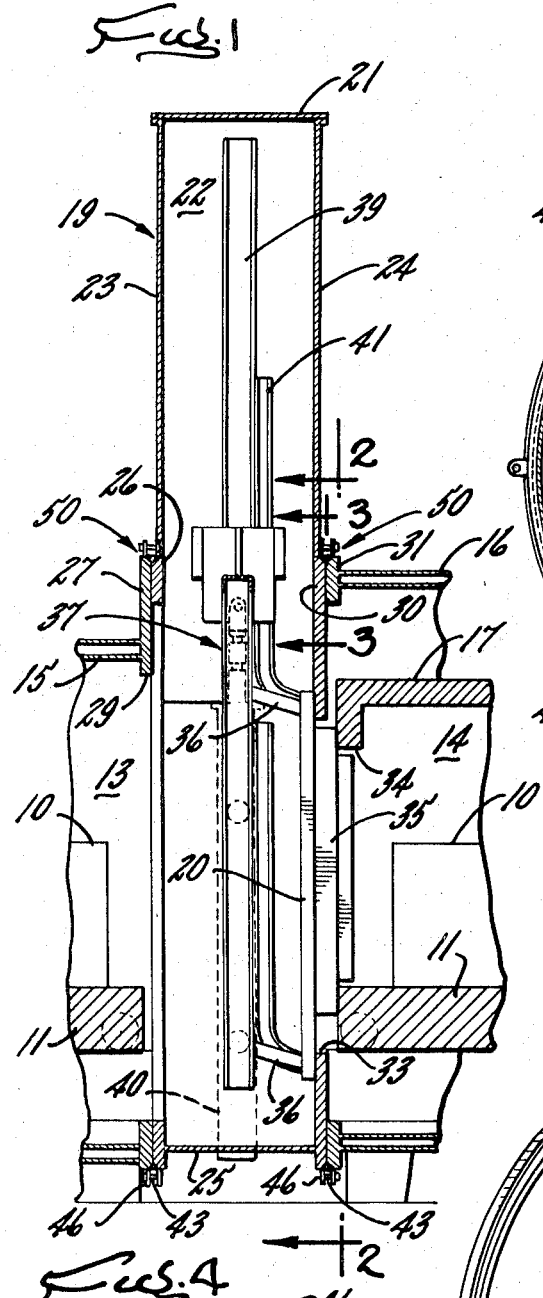
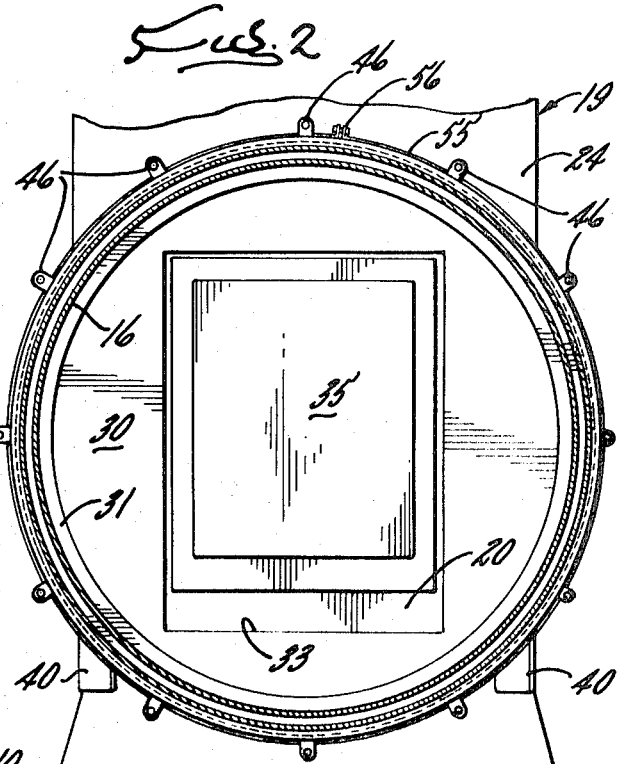
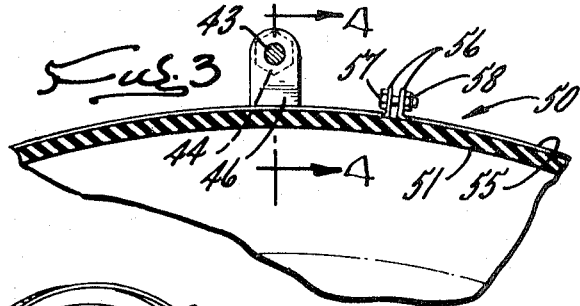
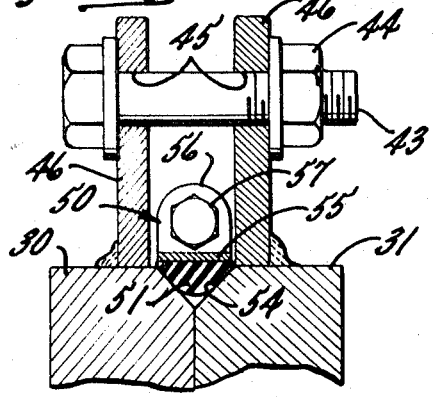
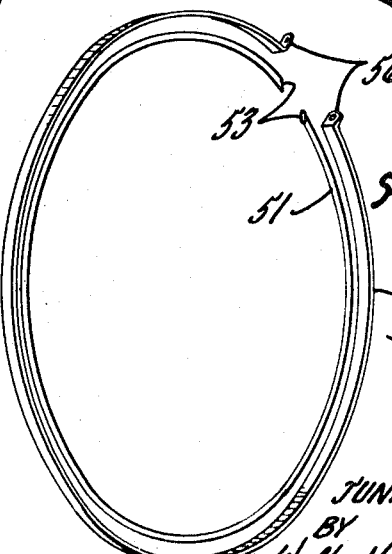
INVENTOR.
JUNE RICHARD BORNOR,
BY
Wolfe, Hubbard, Voit & Osann
ATTORNEYS.

3,625,496

SEALING ASSEMBLY FOR HEAT-TREATING APPARATUS

BACKGROUND OF THE INVENTION

This invention relates to a sealing assembly for heat-treating apparatus and, more particularly, to a sealing assembly with a sealing gasket for establishing a gastight seal between a vessel used in a heat-treating operation and a closure unit which is detachably connected to one end of the vessel to close the latter.

SUMMARY OF THE INVENTION

The primary aim of the present invention is to provide a new and improved sealing assembly of the above character in which the sealing gasket may be quickly and easily removed from between the vessel and the closure unit for replacement purposes without need of disconnecting the vessel and the closure unit from one another. A more detailed object is to achieve the foregoing through the provision of a sealing gasket which is uniquely wrapped around and clamped to the vessel and the closure unit and which simply may be unclamped and unwrapped from the vessel and the closure unit when replacement of the gasket is necessary.

The invention also resides in the novel mounting and location of the gasket to ensure the establishment of an effective seal between the vessel and the closure unit and to reduce damage to the gasket resulting from heat within the vessel.

These and other objects and advantages of the invention will become apparent from the following detailed description when taken in connection with the accompanying drawings.

BRIEF DESCRIPTION OF THE DRAWINGS

FIG. 1 is a fragmentary cross section taken vertically through a heat-treating apparatus quipped with a new and improved sealing assembly embodying the novel features of the present invention.

FIG. 2 is a fragmentary cross section taken substantially along the line 2—2 of FIG. 1.

FIG. 3 is an enlarged fragmentary cross section taken substantially along the line 3—3 of FIG. 1.

FIG. 4 is an enlarged fragmentary cross section taken substantially along the line 4—4 of FIG. 3.

FIG. 5 is an exploded perspective view of the sealing assembly.

DETAILED DESCRIPTION OF THE PREFERRED EMBODIMENT

For purposes of illustration, the invention is shown in the drawings in conjunction with a heat-treating apparatus in which workpieces 10 carried on cars 11 are shifted from a loading chamber 13 into a heating chamber 14 and are heated to high temperatures under a high order of vacuum established by evacuating the air in the heating chamber. Before the workpieces are shifted into the heating chamber, the loading chamber is purged with a nonoxidizing gas to prevent the heating chamber from being contaminated by the ambient atmosphere during transfer of the workpieces.

Herein, the loading and heating chambers 13 and 14 are defined by metal vessels 15 and 16, respectively, which are of generally circular cross section and which are disposed in spaced end-to-end relation. Heating of the workpieces takes place inside of an internal enclosure 17 of refractory material positioned within the heating vessel and housing radiant heating elements (not shown).

In order to enable purging of the loading chamber 13 with a nonoxidizing gas and to enable the drawing of a vacuum in the heating chamber 14, the two chambers must be capable of being sealed with respect to one another. For these purposes, a closure unit 19 disposed between the two vessels 15 and 16 is connected to the vessels with a gastight seal and houses a sealing door 20 which, in this instance, is adapted to seal the heating chamber so as to isolate the atmosphere in the heating chamber from that in the loading chamber and the closure unit.

More particularly, the exemplary closure unit 19 comprises a gastight casing sandwiched between the vessels 15 and 16 and defined by a top wall 21, sidewalls 22, end walls 23 and 24 and a bottom wall 25. Attached to and projecting outwardly from the end wall 23 is a circular flange or ring 26 (FIG. 1) which is connected face-to-face with an annular flange 27 on the inboard end of the loading vessel 15 and which defines an opening 29 permitting passage of the workpieces 10 from the loading vessel. A circular flange or bulkhead 30 projecting outwardly from the end wall 24 is connected face-to-face with an annular flange 31 extending around the inboard end of the heating vessel 16 and is formed with an opening 33 which is aligned with an opening 34 in the internal enclosure 17 to enable transfer of the workpieces into the heating chamber 14.

The sealing door 20 is housed within the closure unit 19 and is adapted to be pressed against the inner face of the bulkhead 30 to close the opening 33 with a gastight seal. Herein, the sealing door is made of relatively lightweight aluminum and is attached directly to a heat shielding door 35 made of heavy refractory material and operable to close the opening 34 in the enclosure 17 so as to block the escape of heat from the enclosure. The two doors are attached by sets of upper and lower pivoted parallel links 36 to a yoke 37 which is guided for up and down movement within the closure unit by center tracks 39 mounted on the sidewalls 22. As the yoke is shifted downwardly by hydraulic actuators 40, side tracks 41 on the sidewalls 22 first guide the doors for downward movement in a vertical path from open positions above the openings 33 and 34 to closed positions aligned with and extending across the openings. With continued downward movement of the yoke, the sidetracks 41 cause the doors to shift laterally or broadwise and thus press the sealing door 20 tightly against the bulkhead 30 while pressing the heat door 35 against the end of the enclosure 17. Accordingly, the sealing door, which carries a sealing gasket (not shown), establishes a gastight seal around the opening 33 to prevent the atmosphere within the loading chamber 13 and within the closure unit 19 from entering the heating chamber 14.

To prevent gas from escaping from the loading chamber 13 and to enable evacuation of the heating chamber 14, the closure unit 19 is connected to the vessels 15 and 16 with a gastight seal. As shown most clearly in FIG. 1, the ring 26 and the bulkhead 30 of the closure unit are butted face-to-face against the flanges 27 and 31 on the vessels and are detachably connected to the flanges by threaded bolts 43 and nuts 44 (FIG. 4). The bolts extend through holes 45 formed through sets of radially projecting ears 46 which are spaced angularly around the ring 26, the bulkhead 30 and the flanges 27 and 31. A sealing assembly 50 with a sealing gasket 51 is located at the joint between the bulkhead 30 and the flange 31 to prevent leakage past the joint.

In accordance with the present invention, the sealing gasket 51 is simply wrapped around the clamped releasably to the outer peripheral sides of the bulkhead 30 and the flange 31, rather than being sandwiched between the opposing faces of the bulkhead and the flange, and may be removed and replaced with a new gasket without need of first disconnecting the heating vessel 16 from the closure unit 19 and then moving the two away from one another. Accordingly, removal of an old gasket and installation of a new gasket may be accomplished quicker and easier than has been possible heretofore.

More specifically and as shown in FIGS. 4 and 5, the sealing gasket 51 comprises an elongated flexible cord made of compressible elastomer material such as Teflon or buna rubber and of such length as to extend completely around the outer circumference of the bulkhead 30 and the flange 31. The ends of the gasket are cut on diagonals as indicated at 53 in FIG. 5 and are butted face-to-face to prevent leakage past the ends. Advantageously, the gasket is seated in an outwardly opening V-shaped groove 54 (FIG. 4) which is formed between the bulkhead and the flange by chambering or otherwise inwardly relieving the opposing outer corners of the bulkhead and the flange. The gasket originally is circular in cross section and, when pressed against the walls of the groove, is flattened inwardly to establish a relatively wide sealing path around the walls of the groove (see FIG. 4) to help maintain a gastight seal at the joint between the bulkhead and the flange. If desired, only the corner on either the bulkhead or the flange need be chamfered thereby to form the groove with one slanted side and one upright side.

To press and hold the gasket 51 snugly in the groove 54, a ringlike clamping band 55 made of resiliently flexible metal encircles the outer side of the gasket and is adapted to be contracted into pressing engagement with the gasket. As shown, ears 56 (FIG. 5) are upturned from the ends of the clamping band and are formed with holes for receiving a threaded bolt 57 and a nut 58. When the bolt is tightened, the ends of the band are drawn toward one another to contract the band radially against the gasket and thus press the latter into the groove 54. By removing the bolt, the ends of the band may be spread apart to allow the band to be slipped from between the bulkhead 30 and the flange 31.

In order to install the sealing assembly 50, the sealing gasket 51 simply may be wrapped around and into the groove 54 between the bulkhead 30 and the flange 31. Thereafter, the clamping band 55 is slipped around the gasket and contracted inwardly against the gasket to seal the latter against the bulkhead and the flange. When replacement of the gasket is required, it is necessary only to remove the clamping bank, unwrap the old gasket, wrap the new gasket between the bulkhead and the flange, and reapply the clamping band. Thus, there is no need of removing the several bolts 43 from between the bulkhead and the flange and moving the relatively large and heavy heating vessel 16 away from the closure unit 19 as would be necessary if the sealing gasket were sandwiched between the opposing faces of the bulkhead and flange.

In addition to being extremely simple to install and replace, the wrap-around sealing gasket 51 is exposed to the outside atmosphere and is located as far as possible from the heating chamber 14 so as to reduce the danger of the gasket being damaged by the heat created in the chamber. Moreover, atmospheric pressure helps press the exposed gasket into the groove 54 to insure that the heating chamber will be maintained in a vacuumtight condition.

A second sealing assembly 50 with a gasket 51 is used between the loading vessel 15 and the closure unit 19, the gasket being seating within a groove formed between the ring 26 and the flange 27. Such sealing gasket thus establishes a gastight seal between the loading vessel and the closure unit and yet may be quickly and easily removed when replacement is necessary.

I claim as my invention:

1. In a heat-treating apparatus, the combination of, a vessel defining a work chamber and having an open end, a flange extending around the open end of the vessel, a closure unit for closing the open end of the vessel and having a flange detachable connected face-to-face with the flange of said vessel, at least one of the opposing corners on the outer peripheries of said flanges being relieved inwardly to define an outwardly opening groove extending around the joint between said flanges, and a sealing assembly for establishing a gastight seal between said vessel and said closure unit, and sealing assembly comprising an elongated flexible sealing gasket of compressible material seated in said groove and wrapped around the outer peripheral portions of said flanges with the ends of the gasket butted together, a clamping band encircling the outer side of said sealing gasket, and means operable to contract said clamping band radially against said gasket to press the gasket radially into said groove into tight-sealing engagement with said flanges and releasable to permit removal of said band and said gasket from said flanges without disconnecting the flanges.

2. Heat-treating apparatus as defined in claim 1 in which both opposing corners of said flanges are chamfered inwardly whereby said groove is formed with a V-shaped cross section.

3. Heat-treating apparatus comprising a vessel defining a work chamber and having an open end, a flange extending around the open end of said vessel, and a closure unit for closing the open end of the vessel and having a flange connected face-to-face with the flange of said vessel, the improvement in said apparatus comprising, a sealing assembly for establishing a gastight seal between said vessel and said closure unit, said sealing assembly including a flexible sealing gasket of compressible material wrapped around the outer peripheries of said flanges and located between the flanges to seal the joint therebetween, a clamping band extending around the outer side of said sealing gasket, and means releasably connecting the ends of said clamping band and operable to draw said ends together to contract said band radially against said gasket and thereby press the gasket radially into tight-sealing engagement with said flanges.

4. Heat-treating apparatus as defined in claim 3 in which the opposing corners on the outer peripheries of said flanges coact with one another to define an outwardly opening groove extending around the joint between said flanges, said sealing gasket being seated in said groove and being pressed against the walls of the groove by said clamping band.

* * * * *